US011835675B2

(12) United States Patent
Riachentsev et al.

(10) Patent No.: US 11,835,675 B2
(45) Date of Patent: Dec. 5, 2023

(54) DETERMINATION OF GEOLOGIC PERMEABILITY CORRELATIVE WITH MAGNETIC PERMEABILITY MEASURED IN-SITU

(71) Applicant: Saudi Arabian Oil Company, Dhahran (SA)

(72) Inventors: Val Riachentsev, Katy, TX (US); Robert Adams, Fulshear, TX (US); Max Deffenbaugh, Fulshear, TX (US); Howard K. Schmidt, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 548 days.

(21) Appl. No.: 16/988,434

(22) Filed: Aug. 7, 2020

(65) Prior Publication Data
US 2021/0041591 A1    Feb. 11, 2021

Related U.S. Application Data

(60) Provisional application No. 62/884,071, filed on Aug. 7, 2019.

(51) Int. Cl.
*G01V 3/28* (2006.01)
*E21B 47/113* (2012.01)
(Continued)

(52) U.S. Cl.
CPC ............... *G01V 3/28* (2013.01); *E21B 47/06* (2013.01); *E21B 47/113* (2020.05); *E21B 49/08* (2013.01); *G01V 3/30* (2013.01); *E21B 49/008* (2013.01)

(58) Field of Classification Search
CPC .. G01V 3/28; G01V 3/30; E21B 47/06; E21B 47/113; E21B 49/08; E21B 49/008
(Continued)

(56) References Cited

U.S. PATENT DOCUMENTS 2,558,427 A    6/1951    Fagan
3,885,212 A    5/1975    Herbert
(Continued)

FOREIGN PATENT DOCUMENTS

CN    103441803    12/2013
CN    103701567    4/2014
(Continued)

OTHER PUBLICATIONS

PCT Invitation to Pay additional Fees and, Where Applicable, Protest Fee in International Appln. PCT/US2020/045362, dated Nov. 11, 2020, 15 pages.
(Continued)

*Primary Examiner* — Farhana A Hoque
(74) *Attorney, Agent, or Firm* — Fish & Richardson P.C.

(57) ABSTRACT

The present device and technique relates to measuring geological formation permeability, such as by injection/withdrawal of conductivity-permeability doped fluid and measuring the magnetic permeability and/or conductivity of the surrounding formation. Before, during and/or after injection or withdrawal, pluralities of electromagnetic measurements of the radial distribution of magnetic permeability and/or conductivity of the surrounding formation may be made. The rate of change of the radial distribution of magnetic permeability and/or conductivity of the formation is generally directly proportional to the permeability of the surrounding formation. In implementations, magnetic permeability and electrical conductivity can be measured independently in time domain or frequency domain, such that the magnetic permeability mapping is not disturbed by other confounding electromagnetic parameters.

7 Claims, 3 Drawing Sheets

(51) Int. Cl.
*E21B 47/06* (2012.01)
*E21B 49/08* (2006.01)
*G01V 3/30* (2006.01)
*E21B 49/00* (2006.01)

(58) Field of Classification Search
USPC .......................................................... 324/339
See application file for complete search history.

(56) References Cited

U.S. PATENT DOCUMENTS

| | | | |
|---|---|---|---|
| 4,023,092 A | 5/1977 | Rogers | |
| 4,589,285 A | 5/1986 | Savit | |
| 4,650,281 A | 3/1987 | Jaeger et al. | |
| 4,808,925 A | 2/1989 | Baird | |
| 4,983,912 A | 1/1991 | Roehrlein | |
| 5,096,277 A | 3/1992 | Kleinerman | |
| 5,158,440 A | 10/1992 | Cooper et al. | |
| 5,335,542 A | 8/1994 | Ramakrishnan et al. | |
| 5,387,863 A | 2/1995 | Lo | |
| 5,494,413 A | 2/1996 | Campen et al. | |
| 5,649,811 A | 7/1997 | Krol, Jr. et al. | |
| 5,729,607 A | 3/1998 | DeFries et al. | |
| 5,767,668 A | 6/1998 | Durand | |
| 6,250,848 B1 | 6/2001 | Moridis et al. | |
| 6,380,534 B1 | 4/2002 | Mahmoud et al. | |
| 6,411,084 B1 | 6/2002 | Yoo | |
| 6,555,807 B2 | 4/2003 | Clayton et al. | |
| 6,808,371 B2 | 10/2004 | Niwatsukino et al. | |
| 6,811,382 B2 | 11/2004 | Buchanan et al. | |
| 6,853,200 B2 | 2/2005 | Munser | |
| 6,856,132 B2 | 2/2005 | Appel et al. | |
| 7,021,905 B2 | 4/2006 | Torrey et al. | |
| 7,622,915 B2 | 11/2009 | Sugiyama | |
| 7,831,205 B2 | 11/2010 | Jack et al. | |
| 7,898,494 B2 | 3/2011 | Brune | |
| 8,229,699 B2 | 7/2012 | Jin | |
| 8,269,501 B2 | 9/2012 | Schmidt et al. | |
| 8,272,455 B2 | 9/2012 | Guimerans | |
| 8,638,104 B2 | 1/2014 | Barber et al. | |
| 8,661,907 B2 | 3/2014 | Davis et al. | |
| 8,816,689 B2 | 8/2014 | Colombo et al. | |
| 8,877,954 B2 | 11/2014 | Giesenberg et al. | |
| 8,885,559 B2 | 11/2014 | Schmidt et al. | |
| 9,051,829 B2 | 6/2015 | Xie | |
| 9,080,097 B2 | 7/2015 | Gupta et al. | |
| 9,129,728 B2 | 9/2015 | Edbury | |
| 9,133,709 B2 | 9/2015 | Huh et al. | |
| 9,528,322 B2 | 12/2016 | MacDonald | |
| 10,117,042 B2 | 10/2018 | Akyildiz et al. | |
| 10,273,399 B2 | 4/2019 | Cox et al. | |
| 10,308,865 B2 | 6/2019 | Cox et al. | |
| 10,308,895 B2 | 6/2019 | Vidal et al. | |
| 10,323,644 B1 | 6/2019 | Shakirov et al. | |
| 10,349,249 B2 | 7/2019 | Akyildiz et al. | |
| 10,444,065 B2 | 10/2019 | Schmidt et al. | |
| 10,487,259 B2 | 11/2019 | Cox et al. | |
| 10,501,682 B2 | 12/2019 | Cox et al. | |
| 2003/0220204 A1 | 11/2003 | Baran et al. | |
| 2005/0152280 A1 | 7/2005 | Pollin | |
| 2006/0076956 A1 | 4/2006 | Sjolie et al. | |
| 2006/0105052 A1 | 5/2006 | Acar et al. | |
| 2007/0114030 A1 | 5/2007 | Todd et al. | |
| 2008/0290876 A1 | 11/2008 | Ameen | |
| 2009/0222921 A1 | 9/2009 | Mukhopadhya et al. | |
| 2009/0255669 A1 | 10/2009 | Ayan et al. | |
| 2009/0264067 A1 | 10/2009 | Pahlavan | |
| 2009/0264768 A1 | 10/2009 | Courtney | |
| 2009/0277625 A1 | 11/2009 | Bai et al. | |
| 2009/0289627 A1 | 11/2009 | Johansen et al. | |
| 2010/0200744 A1 | 8/2010 | Pearce et al. | |
| 2010/0227557 A1 | 9/2010 | Won et al. | |
| 2011/0030949 A1 | 2/2011 | Weaver et al. | |
| 2012/0092960 A1 | 4/2012 | Gaston et al. | |
| 2012/0135080 A1 | 5/2012 | Bromberg et al. | |
| 2012/0281643 A1 | 11/2012 | Sun | |
| 2013/0043887 A1 | 2/2013 | Ziolkowski et al. | |
| 2013/0073208 A1 | 3/2013 | Dorovsky | |
| 2013/0091292 A1 | 4/2013 | Kim et al. | |
| 2013/0109261 A1 | 5/2013 | Koene | |
| 2013/0244914 A1 | 9/2013 | Wu et al. | |
| 2013/0250812 A1 | 9/2013 | Rath | |
| 2013/0296453 A1 | 11/2013 | Giesenberg et al. | |
| 2013/0312970 A1 | 11/2013 | Lafitte et al. | |
| 2013/0332015 A1 | 12/2013 | Dextreit et al. | |
| 2013/0341030 A1 | 12/2013 | Brannon et al. | |
| 2014/0036628 A1 | 2/2014 | Hill et al. | |
| 2014/0041862 A1 | 2/2014 | Ersoz | |
| 2014/0060832 A1 | 3/2014 | Mahoney et al. | |
| 2014/0133276 A1 | 5/2014 | Volker | |
| 2014/0159715 A1 | 6/2014 | McEwen-King | |
| 2014/0190700 A1 | 7/2014 | Tang et al. | |
| 2014/0200511 A1 | 7/2014 | Boyden | |
| 2014/0366069 A1 | 12/2014 | Ramamurthi | |
| 2015/0000657 A1 | 1/2015 | Varvello et al. | |
| 2015/0013983 A1 | 1/2015 | Alwattari | |
| 2015/0036482 A1 | 2/2015 | Schmidt et al. | |
| 2015/0050741 A1 | 2/2015 | Tour et al. | |
| 2015/0118501 A1 | 4/2015 | Lu | |
| 2015/0159079 A1 | 6/2015 | Huh et al. | |
| 2015/0181315 A1 | 6/2015 | Vuran et al. | |
| 2015/0192436 A1 | 7/2015 | Farhadiroushan et al. | |
| 2015/0264627 A1 | 9/2015 | Perdomo et al. | |
| 2015/0268370 A1 | 9/2015 | Johnston et al. | |
| 2015/0319630 A1 | 11/2015 | Kerberg | |
| 2015/0337874 A1 | 11/2015 | Park | |
| 2015/0368547 A1 | 12/2015 | Lesko et al. | |
| 2015/0376493 A1 | 12/2015 | Huh et al. | |
| 2016/0040514 A1 | 2/2016 | Rahmani et al. | |
| 2016/0083641 A1 | 3/2016 | Gamage | |
| 2016/0146662 A1 | 5/2016 | Stokely et al. | |
| 2016/0264846 A1 | 9/2016 | Bennetzen et al. | |
| 2016/0305447 A1 | 10/2016 | Dreiss et al. | |
| 2017/0074093 A1 | 3/2017 | Adebayo | |
| 2017/0234121 A1* | 8/2017 | Anisur Rahman | ... E21B 49/008 166/250.07 |
| 2018/0320059 A1 | 11/2018 | Cox et al. | |

FOREIGN PATENT DOCUMENTS

| | | |
|---|---|---|
| EP | 1721603 | 11/2006 |
| EP | 2789793 | 10/2014 |
| EP | 2801696 | 11/2014 |
| GB | 2442745 | 4/2011 |
| WO | WO 1998046857 | 10/1998 |
| WO | WO 2000023824 | 4/2000 |
| WO | WO 2004113677 | 12/2004 |
| WO | WO 2011063023 | 5/2011 |
| WO | WO 2012154332 | 11/2012 |
| WO | WO 2012158478 | 11/2012 |
| WO | WO 2013142869 | 9/2013 |
| WO | WO 2014066793 | 5/2014 |
| WO | WO 2014100275 | 6/2014 |
| WO | WO 2015020642 | 2/2015 |
| WO | WO 2015044446 | 4/2015 |
| WO | WO 2015084926 | 6/2015 |
| WO | WO 2015086062 | 6/2015 |
| WO | WO 2015095168 | 6/2015 |
| WO | WO 2015134705 | 9/2015 |
| WO | WO 2017205565 | 11/2017 |
| WO | WO 2018022198 | 2/2018 |

OTHER PUBLICATIONS

Agbinya, "A Magneto-Inductive Link Budget for Wireless Power Transfer and Inductive Communication Systems," Progress in Electromagnetics Research C, 37: 15-28, 2013, 14 pages.

Agbinya, "Investigation of Near Field Inductive Communication System Models, Channels and Experiments," Progress in Electromagnetics Research B, 49: 129-153, 2013, 25 pages.

Akyildiz et al., "SoftWater: Software-Defined Networking for Next-Generation Underwater Communication Systems," Ad Hoc Networks, 46: 1-11, Apr. 8, 2016, 11 pages.

(56) References Cited

OTHER PUBLICATIONS americanpiezo.com [online], "Stripe Actuators," available on or before Mar. 13, 2011, via Internet Archive: Wayback Machine URL <https://web.archive.org/web/20110313073802/https://www.americanpiezo.com/standard-products/stripe-actuators.html>, [retrieved on Apr. 6, 2018], retrieved from: URL <https://www.americanpiezo.com/standard-products/stripe-actuators.html>, 2 pages.
Assaf et al., "Accurate Sensors Localization in Underground Mines or Tunnels," IEEE, 2015, 6 pages.
Bagaria et al., "Iron Oxide Nanoparticles Grafted with Sulfonated Copolymers are Stable in Concentrated Brine at Elevated Temperatures and Weakly Adsorb on Silica," ACS Applied Materials & Interfaces, 5:8 (3329-3339), Mar. 25, 2013, 11 pages.
Bala et al., "Interaction of Different Metal Ions with Carboxylic Acid Group: A Quantitative Study," The Journal of Physical Chemistry A, 111:28 (6183-6190), Jun. 2007, 8 pages.
bayspec.com [online], "SuperGamut NIR Spectrometer," available on or before Feb. 2014, [retrieved Apr. 18, 20180], retrieved from: URL <http://www.bayspec.com/wp-content/uploads/2014/02/BaySpec-Datasheet-nir-swir.pdf>, 6 pages.
Bell et al., "Subsurface Discrimination Using Electromagnetic Induction Sensors," IEEE Transactions on Geoscience and Remote Sensing, 39:6, Jun. 2001, 8 pages.
Biswas et al., "Semidefinite Programming Approaches for Sensor Network Localization with Noisy Distance Measurements," IEEE Trans. on Automation Science and Engineering, 3:4 (360-371), Oct. 2006, 12 pages.
Blunt, "Effects of heterogeneity and wetting on relative permeability using pore level modeling", SPE Journal 2:01 (70-87), Mar. 1997.
Boman, "DAS technology expands fiber optic applications for oil, gas industry," Rigzone, May 4, 2015, 4 pages.
Bryant and Blunt, "Prediction of relative permeability in simple porous media" Phys. Rev. A 46:4 (2004-2011), Aug. 1992.
Chappell and Lancaster, "Comparison of methodological uncertainties within permeability measurements" Hydrological Processes 21:18 (2504-2514), Jan. 2007.
Chen et al., "Aggregation Kinetics of Alginate-Coated Hematite Nanoparticles in Monovalent and Divalent Electrolytes," Environmental Science & Technology, 40:5 (1516-1523), Mar. 2006.
Chen et al., "Distributed Source Localization in Wireless Underground Sensor Networks," arXIiv: 1112.4035v1, Dec. 17, 2011, 21 pages.
Chen et al., "Hydration Repulsion between Carbohydrate Surfaces Mediated by Temperature and Specific Ions," Scientific Reports, 6: 1-10, Jun. 23, 2016, 10 pages.
Cole et al., "Polyethylene Glycol Modified, Cross-Linked Starch-Coated Iron Oxide Nanoparticles for Enhanced Magnetic tumor Targeting," Biomaterials, 32:8 (2183-2193), Mar. 1, 2011, 11 pages.
Colombo and McNeice, "Quantifying surface-to-reservoir electromagnetics for waterflood monitoring in a Saudi Arabian carbonate reservoir," Geophysics 78:6, Nov. 2013, 17 pages.
commons.wikimedia.org, [online], "File:6DOF.svg," retrieved from URL <https://commons.wikimedia.org/w/index.php?curid=38429678>, retrieved on Aug. 25, 2020, available on or before Feb. 16, 2015, 5 pages.
Costa et al., "Distributed Weighted-Multidimensional Scaling for Node Localization in Sensor Networks," ACM Trans. Sen. Netw., 2:1 (39-64), Feb. 2006, 26 pages.
Cui et al., "Cross-Layer Energy and Delay Optimization in Small-Scale Sensor Networks," IEEE Transactions on Wireless Communications, 6:10, Oct. 2007, 12 pages.
Danfoss, "Facts Worth Knowing about Frequency Converters," Handbook VLT Frequency Converters, Danfoss Engineering Tomorrow, 180 pages.
De et al., "An Integrated Cross-Layer Study of Wireless CDMA Sensor Networks," IEEE Journal on Selected Areas in Communications, 22:7, Sep. 2004, 15 pages.
DiCarlo et al., "Three-phase relative permeability of water-wet, oil-wet, and mixed-wet sandpacks" SPE Journal 5:01 (82-91), Mar. 2000.
Dixit et al., "A pore-level investigation of relative permeability hysteresis in water-wet systems" SPE Journal 3:02 (115-123), Jun. 1998.
Fatt, "The network model of porous media" Petroleum Transactions 207: 144-181, Dec. 1956.
Gulbahar et al., "A Communication Theoretical Modeling and Analysis of Underwater Magneto-Inductive Wireless Channels," IEEE Transactions on Wireless Communications, 11:9, Sep. 2012, 9 pages.
Heiba et al., "Percolation theory of two-phase relative permeability" SPE Reservoir Eng. 7:01 (123-132), Feb. 1992.
Hui and Blunt, "Effects of wettability on three-phase flow in porous media" J. Phys. Chem. 104:16 (3833-3845), Feb. 2000.
hunting-itl.com, [online], "Mechanical Centralizers and Decentralizers," retrieved from URL <http://www.hunting-intl.com/titan/wireline-hardware-and-accessories/mechanical-centralizers-and-decentralizers>, retrieved on Aug. 25, 2020, available on or before Mar. 2015 via Wayback Machine URL <https://web.archive.org/web/20150322210006/http://www.hunting-intl.com/titan/wireline-hardware-and-accessories/mechanical-centralizers-and-decentralizers>, 1 page.
Jacobs et al., "Downhole fiber-optic monitoring: an evolving technology," Society of Petroleum Engineers, Journal of Petroleum Technology 66:08, Aug. 2014, 2 pages, Abstract only.
Ji et al., "Beyond Convex Relaxation: A Polynomial-Time Non-Convex Optimization Approach to Network Localization," Proceedings IEEE INFOCOM, 2499-2507, Apr. 2013, 9 pages.
Kannan et al., "Analysis of Flip Ambiguities for Robust Sensor Network Localization," IEEE Trans. Veh. Technol., 59:4 (2057-2070), May 2010, 14 pages.
Karalis, "Efficient Wireless Non-Radiative Mid-Range Energy Transfer," Annals of Physics 323:34-48, 2008.
Kisseleff et al., "Throughput of the Magnetic Induction Based Wireless Underground Sensor Networks: Key Optimization Techniques," IEEE Transactions on Communications, 62:12, Dec. 2014, 14 pages.
Kramer, "Water-Soluble Dendritic Architectures with Carbohydrate Shells for the Templation and Stabilization of Catalytically Active Metal Nanoparticles," published by ACS, Macromolecules, 38:20 (8308-8315), Aug. 27, 2005, 8 pages.
Li et al., "In Situ Estimation of Relative Permeability from Resistivity Measurements," Petroleum Geoscience, 20: 143-151, 2014, 10 pages.
Li, "Collaborative Localization with Received-Signal Strength in Wireless Sensor Networks," IEEE Trans. Veh. Technol., 56:6 (3807-3817), Nov. 2007, 11 pages.
Lin et al., "A Tutorial on Cross-Layer Optimization in Wireless Networks," IEEE Journal on Selected Areas in Communications, 24:8, Aug. 2006, 12 pages.
Lin et al., "Magnetic Induction-Based Localization in Randomly-Deployed Wireless Underground Sensor Networks," IEEE Internet of Things Journal, 1-11, Jul. 20, 2017, 11 pages.
machinedesign.com [online], Frances Richards, "Motors for efficiency: Permanent-magnet, reluctance, and induction motors compared," Apr. 2013, retrieved on Nov. 11, 2020, retrieved from URL <https://www.machinedesign.com/motors-drives/article/21832406/motors-for-efficiency-permanentmagnet-reluctance-and-induction-motors-compared>.
Mahmud et. al "Effect of network topology on two-phase imbibition relative permeability" Transport in Porous Media 66:3 (481-493), Feb. 2007, 14 pages.
Martinez et al., "Polysaccharide-based Nanoparticles for Controlled Release Formulations," The Delivery of Nanoparticles, 185-222, May 2012, 39 pages.
Masihpour et al., "Multihop Relay Techniques for Communication Range Extension in Near-Field Magnetic Induction Communication Systems," Journal of Networks, 8:5, May 2013, 13 pages.
Nagy et al., "Comparison of permeability testing methods" Proceedings of the 18th International Conference on Soil Mechanics and Geotechnical Engineering, pp. 399-402, 2013, 4 pages.

(56) References Cited

OTHER PUBLICATIONS

Nie, "Sum of Squares Method for Sensor Network Localization," Computational Optimization and Applications, 43:2 (151-179), 2007, 29 pages.

Niewiadomska-Szynkiewicz, "Localization in Wireless Sensor Networks: Classification and Evaluation of Techniques," Int. J. Appl. Mat. Comput. Sci., 22:2 (281-297), 2012, 17 pages.

Optasense.com [online], "Oilfield Services," available on or before Jun. 2, 2015, via Wayback Machine URL <https://web.archive.org/web/20150602040413/http://www.optasense.com/our-solutions/oilfield-services/>, [retrieved Apr. 6, 2018], retrieved from URL <http://www.optasense.com/our-solutions/oilfield-services/>, 1 page.

piceramic.com [online], "Rectangular Bending Elements," available on or before Mar. 31, 2017, via Internet Archive: Wayback Machine URL <https://web.archive.org/web/20170331054949/https://www.piceramic.com/en/products/piezoceramic-components/bending-elements/>, [retrieved Apr. 6, 2018], retrieved from: URL <https://www.piceramic.com/en/products/piezoceramic-components/bending-elements/>, 2 pages.

Pompili et al., "A Multimedia Cross-Layer Protocol for Underwater Acoustic Sensor Networks," IEEE Transactions on Wireless Communications, 9:9, Sep. 2010, 10 pages.

Purcell "Capillary pressures—their measurement using mercury and the calculation of permeability therefrom" Journal of Petroleum Technology 1:02 (39-48), Feb. 1949.

Rahmani et al., "Characterizing Reservoir Heterogeneities Using Magnetic Nanoparticles," SPE Reservoir Simulation Symposium, May 2015, 29 pages.

Rio-lasers.com [online], "Redfern Integrated Optics (RIO) Colorado Tunable Laser Source," available on or before Sep. 1, 2016, via Wayback Machine URL <https://web.archive.org/web/20160901172454/http://www.rio-lasers.com/pdf/Rio_Colorado_Product%20Brief_1.24.14.pdf> [retrieved Apr. 6, 2018], retrieved from URL <http://www.rio-lasers.com/pdf/Rio_Colorado_Product Brief_1.24.14.pdf>, 2 pages.

Saeki et al., "Upper and lower critical solution temperatures in poly (ethylene glycol) solutions," Polymer, 17:8 (685-689), Aug. 1976, 5 pages.

Sbl.com [online], "Distributed Acoustic Sensing Technology," available on or before Feb. 11, 2017, via Wayback Machine URL <https://web.archive.org/web/20170211002616/https://www.slb.com/services/characterization/geophysics/wireline/distributed-acoustic-seismic-sensing.aspx>, [retrieved on Apr. 6, 2018], retrieved from URL <https://www.slb.com/services/characterization/geophysics/wireline/distributed-acoustic-seismic-sensing.aspx>, 1 page.

Sedlar et al., "Optical fiber magnetic field sensors with ceramic magnetostrictive jackets," Applied Optics, 35:27, Sep. 20, 1996, 2 pages, abstract only.

ShamsiJazeyi et al., "Polymer-Coated Nanoparticles for Enhance Oil Recovery," Journal of Applied Polymer Science, 131:15, Aug. 5, 2014, 13 pages.

Simonetto et al., "Distributed Maximum Likelihood Sensor Network Localization," IEEE Transactions on Signal Processing, 62:6 (1424-1437), Mar. 15, 2014, 14 pages.

Simpson et al., "A Touch, Truly Multiphase Downhole Pump for Unconventional Wells," Spe-185152-MS, Society of Petroleum Engineers (SPE), presented at the SPE Electric Submersible Pump Symposium, the Woodlands, Texas, Apr. 24-28, 2017, 20 pages.

steminc.com [online], "Piezo Ceramic Plate 26x8x0.7mm 108 KHz," available on or before Dec. 30, 2013, via Internet Archive Wayback Machine URL <https://web.archive.org/web/20131230010212/https://www.steminc.com/PZT/en/piezo-ceraminc-plate-26x8x7mm-108-khz>, [retrieved on Apr. 6, 2018], retrieved from URL <https://www.steminc.com/PZT/en/piezo-ceraminc-plate-26x8x7mm-108-khz>, 1 page.

Sun et al., "Design of the fiber optic distributed acoustic sensor based on Michelson interferometer and its location application," Optical Engineering, 42, Oct. 1, 2003, 1 pages, Abstract only.

Sun et al., "Optimal Deployment for Magnetic Induction-Based Wireless Networks in Challenged Environments," IEEE Transactions on Wireless Communications, 12:3, Mar. 2013, 10 pages.

Udd, "An overview of fiber-optic sensors," Review of Science Instruments 66: 4015, Jun. 1995, 16 pages, Abstract only.

Vuran et al., "Communication Through Soil in Wireless Underground Sensor Networks—Theory and Practice," 309-347, 2010, 39 pages.

Vuran et al., "XLP: A Cross-Layer Protocol for Efficient Communication in Wireless Sensor Networks," IEEE Transactions on Mobile Computing, 9:11, Nov. 2010, 14 pages.

Wikipedia.com [online], "Distributed acoustic sensing", Jan. 17, 2012, [retrieved on Feb. 23, 2018], retrieved from URL <https://en.wikipedia.org/wiki/Distributed_acoustic_sensing>, 5 pages.

Yamamoto, "Imaging the permeability structure within the near-surface sediments by acoustic crosswell tomography," Journal of Applied Geophysics, 47:1, May 2001, 11 pages.

Zhan et al., "Characterization of Reservoir Heterogeneity Through Fluid Movement Monitoring with Deep Electromagnetic and Pressure Measurements," SPE 116328, Society of Petroleum Engineers (SPE), SPE International, presented at the 2008 SPE Annual Technical Conference and Exhibition, Sep. 21-24, 2008, 16 pages.

Zhao et al., "Chromatographic Separation of Highly Soluble Diamond Nanoparticles Prepared by Polyglycerol Grafting," Angewandte Chemie International Edition, 50:6 (1388-1392), Feb. 7, 2011, 5 pages.

GCC Examination Report in Gulf Cooperation Council Appln. No. GC 2020-40262, dated Sep. 8, 2021, 7 pages.

PCT International Search Report and Written Opinion in International Appln. No. PCT/US2020/045362, dated Jan. 15, 2021, 21 pages.

* cited by examiner

DETERMINATION OF GEOLOGIC PERMEABILITY CORRELATIVE WITH MAGNETIC PERMEABILITY MEASURED IN-SITU

CROSS-REFERENCE TO RELATED APPLICATION

This application claims the benefit of priority to U.S. Provisional Patent Application Ser. No. 62/884,071, filed Aug. 7, 2019, the contents of which are hereby incorporated by reference herein.

TECHNICAL FIELD

This disclosure relates to the logging of oil and gas wells. Specifically, it is a method to determine the permeability of geological formations intersected by a wellbore.

BACKGROUND

Permeability is a property of a porous medium that relates the flow rate to the applied pressure gradient. It is related to the size scale of the pore space within the medium and to its interconnectedness. The permeability of a subsurface rock formation, such as an oil or gas reservoir, controls the rate at which hydrocarbons can be produced and often determines whether producing oil and gas from a given reservoir will be profitable or not. When developing an oilfield, a computer model of the reservoir is used to simulate the subsurface movement of oil, gas and brine for different scenarios of where to locate wells, how quickly to produce from the wells, and where to inject other fluids to help sweep out the hydrocarbons. The accuracy of these computer model predictions depends primarily on how accurately the permeability throughout the reservoir is known, and where high permeability barriers to flow are found.

Despite their importance for optimizing oil and gas production, accurate measurements of permeability are difficult to obtain. The permeability of a reservoir rock is typically determined by laboratory measurements on samples of the rock which are recovered from the subsurface using a process called "coring". After coring, the samples are transported to a laboratory and resaturated with a mixture of oil, gas, and brine similar to what was believed to be in the rock when it was part of the reservoir. Oil or brine are then pushed through the rock sample with a prescribed pressure gradient and the resulting flow rates are measured. This process is time-consuming and costly, and can be inaccurate. The selected rock samples may not be representative of the properties of the reservoir. The detailed distribution of hydrocarbons and brine within the pore space of the sample impacts the phase permeabilities for oil and brine, but cannot be accurately known or reconstructed in the laboratory. Furthermore, the wettability of the rock surface within the pore space impacts measured phase permeabilities and cannot be accurately reconstructed in the lab.

Accordingly, there is a need for a method of determining the permeability of reservoir rocks which samples larger rock volumes than the small samples (e.g., 1 inch to 6 inch) measured in the laboratory. A method should ideally make its measurements in the reservoir itself so that the fluid distributions and wettability will be correct and will not need to be reconstructed. This disclosure describes such a method and associated system and tool.

SUMMARY

An aspect relates to a system to determine the phase permeabilities of a subsurface formation surrounding a borehole. The system includes 1) a fluid with an elevated magnetic permeability; 2) a means to inject the fluid into the subsurface formation; 3) a downhole tool capable of measuring the mutual inductance between pairs of inductive coils where the magnetic field of the coils extends beyond the borehole and into the formation; 4) a process for imaging the magnetic permeability of the formation near the borehole from the measurements of mutual inductance; 5) a process for relating the image of magnetic permeability near the borehole to the phase permeabilities of the formation.

Another aspect relates to a method to determine the permeability downhole of a geological formation surrounding a borehole. The method includes deploying a downhole tool into the borehole at a specific depth and measuring, via the downhole tool, a baseline radial profile of magnetic permeability of the geological formation around the downhole tool. The method includes injecting a fixed amount of magnetic-permeability doped fluid into the geological formation around the downhole tool. The method includes measuring, via the downhole tool, a post-injection radial profile of magnetic permeability of the geological formation around the downhole tool after injecting the fixed amount of magnetic-permeability doped fluid. The method includes comparing the baseline radial profile with the post-injection radial profile to determine a difference between the post-injection radial profile and the baseline radial profile. The method includes using the difference in magnetic permeability of the geological formation around the tool to determine the permeability of the formation.

Yet another aspect relates to a method to determine the permeability downhole of a formation surrounding a borehole. The method includes deploying a downhole tool into the borehole at a specific depth and injecting a fixed amount of magnetic-permeability doped fluid into the formation around the downhole tool. The method includes measuring, via the downhole tool, a post-injection radial profile of magnetic permeability of the formation around the downhole tool after injecting the fixed amount of magnetic-permeability doped fluid. The method includes withdrawing fluid from the formation and measuring, via the downhole tool, a post-production radial profile of magnetic permeability of the formation around the downhole tool after withdrawing a fixed amount of fluid from the formation. The method includes correlating a difference between the post-production radial profile and the post-injection radial profile with permeability of the formation around the downhole tool.

Yet another aspect relates to a system to determine permeability of a geological formation. The system includes a downhole tool to measure magnetic permeability of the geological formation. The system includes a pump to inject fluid having magnetic particles through a first wellbore into the geological formation. The system includes a vessel to receive fluid having magnetic particles withdrawn from the formation through a second wellbore.

Yet another aspect relates to a method including deploying a downhole tool into a wellbore in a geological formation and measuring, via the downhole tool, a baseline radial profile of magnetic permeability of the geological formation. The method includes injecting a fluid having magnetic particles into the geological formation. The method includes measuring, via the downhole tool, a post-injection radial profile of magnetic permeability of the geological formation after injecting the fluid having magnetic particles. The method includes comparing the baseline radial profile with the post-injection radial profile to determine permeability of the geological formation.

Yet another aspect relates to a method including deploying a downhole tool into a wellbore in a geological formation and injecting a fluid having magnetic particles into the geological formation. The method includes measuring, via the downhole tool, a post-injection radial profile of magnetic permeability of the formation after injecting the fluid having the magnetic particles. The method includes withdrawing a produced fluid having magnetic particles from the geological formation. The method includes measuring, via the downhole tool, a post-production radial profile of magnetic permeability of the geological formation after withdrawing the produced fluid having magnetic particles from the geological formation. The method includes correlating a difference between the post-production radial profile and the post-injection radial profile with permeability of the geological formation.

Yet another aspect relates to a method to determine permeability of a geological formation. The method includes deploying a downhole tool (having a transmitter coil) into a wellbore in the geological formation, the downhole tool comprising electronics to measure the self-inductance of said transmitter coil. The method includes injecting magnetic particles into the geological formation and measuring, via the downhole tool, magnetic permeability of the geological formation having the injected magnetic particles.

Yet another aspect relates to a method to determine permeability of a geological formation. The method includes lowering a downhole tool (having a transmitter and a receiver) into a wellbore in the formation. The method includes injecting magnetic particles through the wellbore into the formation, withdrawing the magnetic particles from the formation through the wellbore, and measuring magnetic permeability of the formation via the downhole tool during injecting the magnetic particles and during withdrawing the magnetic particles.

Yet another aspect relates to a downhole tool to determine permeability of a geological formation. The downhole tool includes a transmitter to emit a magnetic field into the geological formation. The downhole tool includes a receiver to sense the magnetic field for the downhole tool to measure magnetic permeability of the geological formation. The downhole tool includes an electronics module having a processor and memory storing code executable by the processor to facilitate operation of the downhole tool and to provide data of the measured magnetic permeability for determination of the permeability.

The details of one or more implementations are set forth in the accompanying drawings and the description to be presented. Other features and advantages will be apparent from the description and drawings, and from the claims.

DETAILED DESCRIPTION

The present application describes a method and apparatus for determining the phase permeability of a rock formation along a borehole. A fluid with elevated magnetic permeability is created by mixing particles of high magnetic permeability into a water-based or oil-based fluid. The fluid is injected into the formation around a borehole by applying a pressure in the borehole which exceeds the formation pressure by an excess pressure $\Delta P$ for a time duration $\Delta T$. This excess pressure $\Delta P$ acting over time $\Delta T$ drives the injected fluid a distance $\Delta R$ into the formation, where $\Delta R$ depends on the phase permeability $k_i$ of the formation to the injected phase, whether brine or oil. If $\Delta R$ is found, then $k_i$ can be calculated. In one embodiment, $\Delta R$ is found by measuring the mutual inductance between pairs of solenoid coils around the axis of the tool and inverting for the value of $\Delta R$ which may best explain the measured mutual inductances. In one embodiment, $\Delta R$ is found by measuring the self-inductance of a solenoid coils around the axis of the tool and inverting for the value of $\Delta R$ which may best explain the measured self-inductance.

Permeability is a property of porous medium such as a reservoir rock which relates the flow rate through the rock to the pressure gradient that drives the flow. This relationship is expressed by Darcy's Law:

$$q = -\frac{k}{\mu}\nabla p$$

where q is the flow rate per unit area, for example in units of m/s, $\mu$ is the dynamic viscosity of the fluid, for example in units of Pa·s, $\nabla p$ is the pressure drop over a given distance of the material in units of Pa/m, and k is the permeability of the material in units of m². Permeability is difficult to measure downhole. Such lack of measurement downhole can lead to inaccurate estimations of the economic capacity of a petroleum reservoir. In-situ downhole implementations of permeability measurements can be more reliable for quantifying reservoir behavior than via ex-situ measurements of permeability.

Permeability, which is also referred to as "absolute permeability" is a property of a porous medium where the pore space is filled with a single fluid. When the pore space is filled with more than one fluid, such as a mixture of oil and brine, then the flow of one fluid (e.g., oil) when it is injected with a given pressure drop can be different from the flow of another fluid (e.g., brine) when it is injected with the same pressure drop. For the ith fluid phase, $$q_i = -\frac{k_i}{\mu_i}\nabla p$$

where $q_i$ is the flow rate of the ith fluid phase per unit area, for example in units of m/s, $\mu_i$ is the dynamic viscosity of the ith fluid phase, for example in units of Pa·s, $\nabla p$ is the pressure drop over a given distance of the material in units of Pa/m, and $k_i$ is called the "phase permeability" of the medium to the ith fluid phase in units of m². The ratio of the phase permeability to the absolute permeability is the "relative permeability". The relative permeability is defined as, $$k_{r,i} = \frac{k_i}{k}$$

The relative permeability has a value from 0 to 1 and describes the extent to which the other fluids in the pore space impede the flow of the ith fluid phase through the medium.

The permeability, absolute permeability, phase permeability, and relative permeability all refer to factors which influence the flow of fluids through a porous medium such as a reservoir rock. Embodiments of the inventive method determine phase permeability by injecting and measuring the penetration of a fluid which has magnetic permeability (e.g., an elevated magnetic permeability). Magnetic permeability is an electromagnetic property which describes the degree of magnetization produced in the material by the application of a magnetic field. To prevent confusion, in this application we will refer to "magnetic permeability" when we mean the electromagnetic property. Otherwise "permeability" will mean a property of porous media related to fluid flow.

Figure 1:
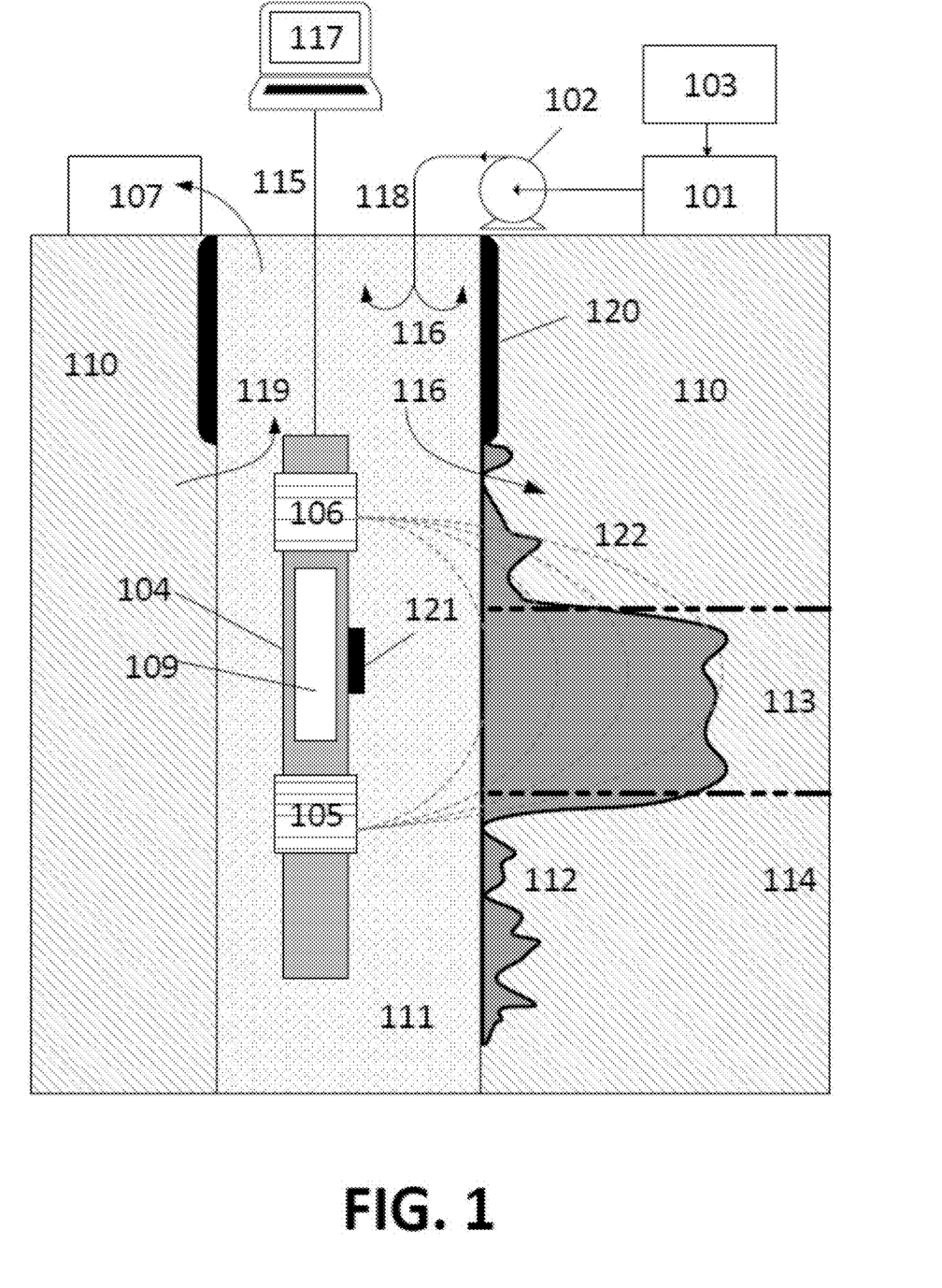
FIG. 1 is a diagram of a well site including a system to measure permeability of a geological formation.

FIG. 1 shows a system for determining the phase permeabilities of a subsurface geological formation 110 in proximity to a wellbore 111. The formation 110 may include a solid matrix (for example, made of grains of silica or calcite) and a pore space within the matrix which is full of hydrocarbons, such as crude oil and natural gas, and/or brine. A system to determine permeability of the geological formation 110 may include surface equipment 101,102,103,107 as well as a downhole tool 104. This surface equipment includes equipment to mix particles with high magnetic permeability into a fluid to form a fluid with elevated magnetic permeability. Fluid vessel 101 holds the fluid. In various embodiments, the fluid may be brine extracted from the well, brine from a different source, an artificially formulated water-based fluid, oil extracted from the well, oil extracted from a different source, and artificially-formulated oil-based fluid. A brine or water-based fluid may be beneficial when desired to measure the phase permeability to brine. An oil or oil-based fluid may be beneficial when desired to measure the phase permeability to oil.

Particle vessel 103 holds magnetic particles (for example, ferrous particles) with a high magnetic permeability which will be added and mixed into the fluid in the fluid vessel 101. The vessel 103 may store magnetic particles, such as magnetic nanoparticles, that are added to the fluid in the fluid vessel 101 to increase the magnetic permeability of the fluid. The magnetic particles may optionally have a coating applied, such as described in U.S. Pat. Nos. 10,273,399, 10,308,865, 10,487,259, and 10,501,682, which are incorporated by reference herein in their entirety. In various embodiments, the mixing of the particles with the fluid may occur at the surface as illustrated in FIG. 1 or may occur downhole within the wireline tool or by a second tool deployed for this purpose, where the tank for storing magnetic particles may be located within the tool rather than at the surface.

FIG. 1 is a well having a wellbore 111 in a geological formation 110 (subterranean formation). A pump 102 acts to develop a pressure in the wellbore 111 which exceeds the pressure far from the wellbore in the formation 110 such that the fluid with elevated magnetic permeability from vessel 101 is forced into the formation 110, causing a portion 112 of the formation 110 near the wellbore to become saturated with the fluid such that this saturated portion of the formation 110 has a higher magnetic permeability than portions that did not become saturated with the fluid. The saturated region 112 extends further from the wellbore in the radial direction in parts of the formation 110 with high permeability 113, and does not extend as far in parts of the formation 110 with low permeability 114. Casing pipe 120 of the wellbore 111 may prevent the fluid from penetrating the formation 110 at certain depths.

The fluid along with the magnetic particles is injected into the wellbore 111, as indicated by arrow 116. The injection may be via a motive device, such as a pump 102. The surface equipment may include the pump 102 to deliver the fluid (or a slurry of the fluid and magnetic particles) from the fluid vessel 101 into the wellbore 111 and thus into the formation 110. The pump 102 may be, for example, a centrifugal pump. The fluid or slurry discharges from the pump 102 though a conduit 118, such as piping or tubing, into the wellbore. The pumping of the fluid through the wellbore may provide pressure (pump head) for penetration of the magnetic particles into the formation 110. The surface equipment may include a return vessel 107 to receive a return 119 of a slurry of fluid and magnetic particles from the formation 110. The return vessel 107 may be a tank to receive the return 119 including fluid and magnetic particles. The return 119 may be produced from the formation 110 through the wellbore to the return vessel 107. The surface equipment may be a fluid or slurry system for injection and withdrawal of fluid and magnetic particles. In various embodiments, the injection pump may be located at the surface or may be located downhole such as within the wireline tool or within a coiled tubing conveyed tool.

A downhole tool 104 may collect data which can be used to determine the extent of the saturated region 112, and from this log the phase permeability of the formation 110 along the wellbore 111. To do so, the downhole tool 104 may have an electronics module or apparatus 109, transmitter 106 antenna (antenna coil), and receiver 105 antenna (antenna coil), and may measure the mutual inductance between the transmitter and receiver coils. In the illustrated embodiment, the downhole tool 104 is depicted disposed in a wellbore 111 within a formation 110. The downhole tool 104 may be lowered into the wellbore from the Earth surface via, for example, a wireline cable 115.

The electronics module 109 may have a hardware processor and memory storing code executed by the processor to operate the downhole tool 104. The memory may store collected data. The data may include measurements of the mutual inductance between the transmitter 106 and receiver 105 coils. The electronics module 109 may transmit data to the Earth surface via a wireline cable 115, wireless communication, or another telemetry system. Alternatively, the electronics module 109 may store the data in its internal memory to be downloaded after the tool is retrieved from the wellbore. A computing system 117 may receive the data from the tool. The computing system 117 may include a processor and memory storing code executed by the processor to process the data. Such processing may include determining the phase permeability of the formation 110 based on measured mutual inductance or self-inductance or other property related to the magnetic permeability of the formation.

The wellbore 111 may be open-hole or may have casing 120. For a cased wellbore 111, the annulus between the casing and the formation may be cemented. The casing and cement may have perforations to allow fluid and particle flow through the cemented casing between the formation 110 and the wellbore 111.

In various embodiments, the portion of the wellbore 11 where the fluid is to be injected may be isolated from the remainder of the wellbore 111 using packers such that the injection pressure is only applied in the desired portion of the wellbore 111. Fluid may be initially produced from a portion of the wellbore to remove mudcake from the borehole wall. The fluid injection may occur during a drill stem test, where the fluid is injected immediately following or during the flow rate testing. In various embodiments, a formation fluid sampling tool may attach to the borehole wall, produce fluid from the formation to remove mudcake, and then perform the fluid injection.

During the injection 116 of the fluid having magnetic particles and during the subsequent production of the return 119 having magnetic particles, the downhole tool 104 may produce a magnetic field 122. The tool 104 may produce the magnetic field 122 via the transmitter 106 antenna through the formation 110 and detect the magnetic field 122 via the receiver 105 antenna. Thus, the mutual inductance may be determined between the transmitter and receiver coils. From the mutual inductance measurement, the extent of invasion 112 of the fluid with elevated magnetic permeability may be determined as the measured mutual inductance changes over time during the injection and withdrawal of fluid with magnetic particles. The downhole tool 104 as an electrical apparatus may measure magnetic permeability ($\mu$) of the geological formation 110 during fluid injection 116 and withdrawal 119. Before, during, and after injection or withdrawal, multiple electromagnetic measurements (images) can be made and captured by the downhole tool 104.

Thus, embodiments provide for a downhole tool 104 and associated surface equipment to measure magnetic permeability in-situ. The sensor array (transmitter 106 antenna and receiver 105 antenna with the electronics module 109) may make an initial measurement or logging run before injection of magnetic particles. This initial measurement may serve as a baseline measurement of local magnetic permeability. As discussed, magnetic particles (e.g., magnetic nanoparticles) may then be injected into the wellbore 111 and dispersed through the formation 110. The sensor array may measure (for example, continually) the local magnetic permeability distribution. The downhole tool 104 may record changes to this measured quantity of magnetic permeability as the magnetic particles travel through the formation 110 and affect the local magnetic permeability surrounding the sensor array. The particle dispersion may then be reversed by producing from the formation 110. The sensor array may continually measure the local magnetic permeability and record changes to this measured quantity over time during the production of particles from the formation 110. By measuring local magnetic permeability during (1) the baseline, (2) the injection of magnetic nanoparticles, and (3) the production of magnetic nanoparticles from the well, the tool sensor array may obtain a set of radial profiles of particle distribution as a function of time. The evolution of magnetic-permeability radial profiles can be a function of permeability. Therefore, by comparing these radial profiles as a function of time, the permeability may be obtained.

The induction transmitter(s) 105 and receiver(s) 106 may be positioned along the tool 104 axis. The electronics module 109 via electrical equipment of the tool 104 may generate an electrical voltage or current waveform to be applied to the transmitter 105 coil. The transmitter 105 may cause a magnetic field to travel through the formation 110, inducing a voltage waveform in the receiver 106 antenna coils. The electronics module 109 may condition and process the signals from receiver 106 antenna coils. The acquired data may be stored in the downhole tool 104 or sent to the Earth surface via telemetry through the wireline cable 115 utilized to lower the tool 104 into the wellbore.

The waveform applied to the transmitting coil may be a sin-wave (sine wave) at a single frequency, a combination of sin-waves at multiple frequencies, or a square-wave with a continuum of frequency content. The downhole tool 104 including its electronics module 109 may utilize single frequency sin-wave, multiple-frequency sin wave, or square-wave transmissions in order to interrogate the magnetic permeability of the surrounding formation.

The downhole tool 104 can be of a transformer-type having at least one receiver 106 antenna coil and at least one transmitter 105 antenna coil or of an inductive type having a single coil (self-inductance), such as with a transmitter 105 antenna but no receiver 106 antenna. A downhole tool 104 of a transformer type has a separate transmitter 105 antenna and receiver 6 antenna as depicted in FIG. 1 and discussed earlier. In other words, the measuring apparatus of the tool 4 may have at least one transmitter 5 antenna and at least one receiver 6 antenna and may measure the mutual inductance between the antennas. Mutual inductance may be the extent to which a time-varying current in the transmitter antenna induces a voltage in the receiver antenna, so it may be determined in one embodiment by applying a time-varying current to the transmitter antenna and measuring the voltage induced in the receiver antenna. The mutual inductance depends on the magnetic permeability of the formation around the tool, such that injecting a fluid with elevated magnetic permeability into the formation causes an increase in the magnetic permeability of the formation where the fluid penetrates. This will result in an increased mutual inductance measured between the transmitter and receiver coils.

In operation, the electromagnetic transmitter 105 antenna radiates a time-varying magnetic field into the formation and induces a time-varying voltage in receiving coils (receiver 105 antenna) which is determined at least in part by the field which has passed through the formation 110. Induced voltage at the receiver 105 antenna coils may depend on electrical and magnetic properties of formation 110. For the transformer type, the downhole tool 104 may have one transmitter 105 antenna and one receiver 106 antenna or may have one active transmitter antenna and multiple simultaneously active receiver antennae, or may have multiple simultaneously active transmitter 105 antennae, for example operating at different frequencies, and one or multiple simultaneously active receiver 106 antennae.

The mutual inductance between a pair of transmitter and receiver coils is not equally sensitive to magnetic permeability changes at all depths or at all radial distances from the axis of the tool. Rather, the sensitivity is greatest near the depth of the coils. The sensitivity is a function of radial distance into the formation that depends on the separation of the coils along the axis of the tool. Thus, by measuring the mutual inductance between the coils with different separation distances along the tool axis, the magnetic permeability at different depths into the formation can be determined, thus the magnetic permeability at different radial distances from the wellbore axis can be measured. In one embodiment, there are multiple pairs of transmitter and receiver coils with different separations between transmitter and receiver coils, such that measuring the mutual inductance between these pairs of coils allows the magnetic permeability to be determined as a function of radial distance from the tool axis. In one embodiment, a coil can be configured by the electronics inside the tool to function as a transmitter at one time and a receiver at a different time to reduce or minimize the number of coils required to achieve a desired set of coil separations.

In one embodiment, the downhole tool 104 may be of an inductive type, where a single coil functions as both transmitter and receiver at the same time. In this case, a time-varying voltage is applied to the coil and the time-varying current produced through the same coil are measured to determine the self-inductance of the coil. This self-inductance depends on the magnetic permeability of the formation around the tool, such that injecting a fluid with elevated magnetic permeability results in an increase in the self-inductance of the coil. The self-inductance of the coil is not equally sensitive to magnetic permeability changes at all locations in the formation. Rather it is most sensitive to magnetic permeability changes at the depth of the coil, and at radial distances that depend on the length of the coil. A longer coil projects its magnetic field further into the formation and is therefore sensitive to magnetic permeability changes deeper in the formation. In one embodiment, the tool contains multiple coils of different length to probe the magnetic permeability at different distances into the formation. In another embodiment, the tool contains a single long coil, where the electronics inside the transmitter may connect to and energize longer or shorter segments of the same coil to achieve different sensitivity depths without requiring multiple coils.

The receiver and transmitter coils of the transformer-type tool and the single coil of the inductive-type tool may be solenoids with a constant winding density or constant number of turns per unit length along the coil length, or they may have varying densities of windings along their length, or may be made up of smaller solenoid segments connected in series and positioned at uniform or non-uniform spacing along the axis of the tool. These different coil geometries can be selected to achieve the desired magnetic field strength at different axial and radial distances from the center of the tool, which will produce different sensitivities in the axial and radial direction to changes in magnetic permeability, sensitivity being greater where the magnetic field is stronger.

These solenoidal coils wound around the axis of the tool are equally sensitive to permeability changes at all radial directions from the tool. The receiver and transmitter coils may have turns around an axis perpendicular to the axis of the tool to sense magnetic permeability selectively in one radial direction.

The propagation of electromagnetic waves in any medium is determined by the conductivity, permittivity, and magnetic permeability of the medium. The inventors recognized that the injection of a fluid into a formation will cause changes in the conductivity and permittivity of the formation by at least two mechanisms: the injected fluid will partially replace the mixture of hydrocarbons and brine originally in the pore space and the displaced mixture will push through the formation ahead of the injected fluids, changing the water/oil saturation even beyond the reach of the injected fluids. The degree to which the pore fluids are displaced and the alterations in saturation produced by the displaced fluids ahead of the injected fluids are confounding variables that would make it difficult to determine the penetration of an injected fluid which differed from the pore fluids in its conductivity or permittivity. The inventors recognized that the existing pore fluids are non-magnetic having a magnetic permeability exactly equal to that of free space. Thus, any measured change in the magnetic permeability of the formation can only indicate the presence of injected fluid with enhanced magnetic permeability. Although the change in magnetic permeability achievable by adding magnetic particles to the injected fluid is small (roughly 1%), there is generally no other possible cause for magnetic permeability change downhole other than the injected fluid. Thus in embodiments, the injected fluid has an elevated magnetic permeability.

The mutual inductance between transmitter and receiver coils or the self-inductance of a single coil are influenced by the conductivity of the medium due to the induction of eddy currents and by the magnetic permeability of the medium. The inventors recognized that the effect of eddy currents on the mutual inductance or self-inductance could be made negligibly small by reducing the frequency of the measurement. For coil separations up to several meters and typical conductivities of downhole rocks, a measurement frequency below 1 kHz is essentially unaffected by conductivity changes that might be caused by fluid injection. This ability to measure magnetic permeability at a frequency where there was no confounding effect of conductivity changes is another reason why injecting a fluid with elevated magnetic permeability is implemented in embodiments.

In another embodiment, the assembly or tool 104 may measure magnetic permeability and electrical conductivity by using measurement frequencies that are high enough to sense both effects, or one higher frequency which sees both effects and one lower frequency which sees only the effect of magnetic permeability. Conductivity may be measured in this way to minimize or remove the effect of the formation fluid changes during magnetic permeability measurement.

Once the mutual inductance between the coils is measured for at least one frequency and coil separation or the self-inductance of a coil is measured for at least one frequency and coil length, the magnetic permeability of the formation can be found by solving an inverse problem. In one embodiment, the region around the tool is divided into N smaller cells which are assumed to have a constant permeability. In one embodiment, the region is divided into cells by surfaces at various radii from the borehole, forming cells which are cylindrical cells all having the same axis as the borehole, for example, with each cell having the same thickness or cells having thicknesses that increase exponentially or proportionally with their radii. The M mutual inductances between all pairs of coils for a transformer type tool and/or the M self-inductances of all coils for an induction type tool are computed in numerical simulation for a background case where the magnetic permeability in all cells equals the permeability of free space. If P frequencies are used in the measurement, then the simulation is repeated for each frequency producing M*P measurements. Then the magnetic permeability of each of the N cells is increased slightly in turn, for example by $dp=0.001*\mu_0$ where $\mu_0$ is the magnetic permeability of free space, and the M*P measurements are recalculated and the measurements in the unincreased (baseline) case are subtracted to provide M*P measurement differences. These M*P measurement differences are divided by dp and placed in the rows of a M*P×N matrix C, which relates a perturbation in the mutual inductance in any combination of the N cells to the corresponding change in the measurements:

$$y=Cx$$

Where C is the change in magnetic permeability and y is the change in the measured mutual inductances. When the difference between the measured mutual inductances and the baseline mutual inductances are found in the field, an estimate $\hat{x}$ of the magnetic permeability variations (from the baseline or free space permeability) in the cells around the borehole can be found in one embodiment as the least squares inverse, $$\hat{x}=(C^H C)^{-1} C^H y$$

Where H indicates the Hermetian or complex conjugate transpose. This allows the mutual inductance changes in C to be complex valued, allowing for complex mutual inductances where the imaginary part would represent a resistive component due to circuit or coil resistances or losses in the medium due to eddy currents). Optionally, a N×N covariance matrix P can be added inside the inverse to regularize the inverse, that is, to prevent it from being unstable when $C^H C$ is not full rank or has eigenvalues which vary by many orders of magnitude. In one embodiment, $P=I\sigma^{-2}$ where I is the identity matrix, and $\sigma^2$ is a constant that may be determined experimentally or may be the prior variance of the mutual inductance variations.

$$\hat{x}=(C^H C+P)^{-1} C^H y$$

If the magnetic permeability of the fluid is $\mu_f$ and the background magnetic permeability of the formation before injection was $\mu_0$ and magnetic permeability as a function of radial distance is $\mu(r)$, $r_w$ is the radius of the wellbore, and $r_{max}$ is a radius beyond which there is no significant change in magnetic permeability, then the flow rate per unit depth of the ith phase can be found as the total volume of injected fluid divided by the duration of the injection $\Delta T$, $$\frac{q_i}{h} = \frac{2\pi}{\Delta T} \int_{r_w}^{r_{max}} \frac{\mu(r) - \mu_0}{\mu_f - \mu_0} r\, dr$$

To determine the phase permeability of the formation, a pressure transducer 121 is provided in the wireline tool 4 preferably at the depth where the injection will take place, for example, it could be placed between the coils 5 and 6. The pressure transducer measures an injection pressure $P_I$ at the injection depth in the wellbore during the injection and a formation pressure $P_W$ before or after the injection when there is no fluid moving in or out of the reservoir. Using the inflow performance relationship for the well, preferably for a transient flow where the pressure effect of the injection has not reached the boundaries of the formation, we have the phase permeability for the ith phase in millidarcies:

$$k_i = -\frac{162.6 \mu_i}{(P_W - P_I)} \left[ \log\left(\frac{k_i t}{\phi \mu_i r_w^2}\right) - 3.23 + 0.87s \right] \frac{q_i}{h}$$

Where $\mu_i$ is the viscosity of the ith phase in centipoise (cp), t is the time of the injection in hours, $\phi$ is the volume fraction of injected fluid in the rock near the wellbore, which can be taken as a volume-weighted average over those distances r where the formation is substantially full of injected fluid:

$$\phi(r) = \frac{\mu(r) - \mu_0}{\mu_f - \mu_0}$$

And s is the skin factor, which indicates the extent to which there is a low permeability skin on the face of the formation which prevents fluid flow.

Figure 2:
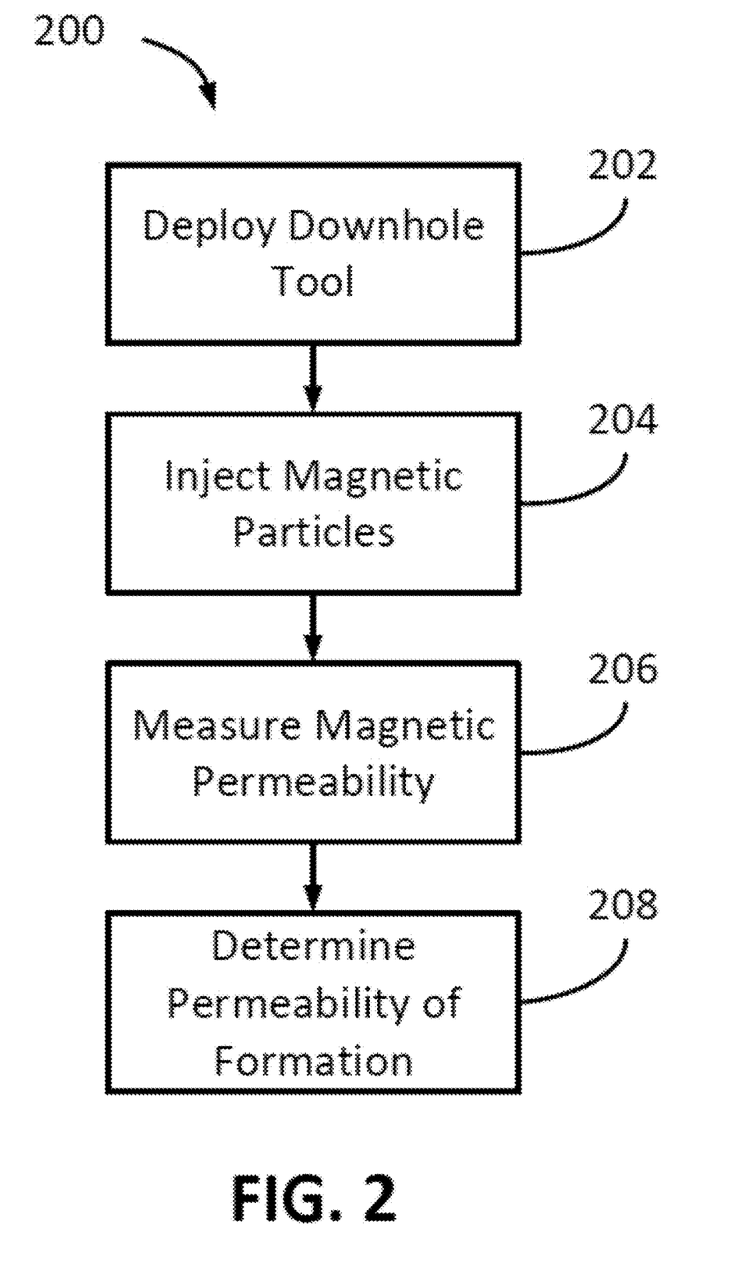
FIG. 2 is a block flow diagram of a method of determining permeability of a geological formation.

FIG. 2 is a method 200 to determine the permeability (such as the phase permeability or the absolute permeability) of a geological formation (subterranean formation). The geological formation may be a formation in the Earth crust. The formation may have hydrocarbons in the pore space and thus be labeled as a hydrocarbon-bearing formation.

At block 202, the method includes deploying a downhole tool into a wellbore in the geological formation. The downhole tool includes a transmitter and a receiver. The downhole tool may include an electronics module to direct operation of the downhole tool. The deploying of the downhole tool may include lowering the downhole tool into the wellbore via a wireline. The method may include calibrating the downhole tool in air outside of the wellbore before lowering the downhole tool into the wellbore.

At block 204, the method includes injecting magnetic particles through the wellbore into the geological formation. The injecting may involve pumping fluid having the magnetic particles from through Earth surface through the wellbore into the geological formation. For an open-hole wellbore with no casing at the depth of injection, the fluid having the magnetic particles may flow through the wellbore directly into the geological formation. For a wellbore with a casing or cemented casing, the fluid having the magnetic particles may flow through the wellbore and through perforations in the casing into the geological formation. In one embodiment, the magnetic particles may be carried by an oil-based fluid to measure the phase permeability for oil. In one embodiment, the particles may be carried by a water-based fluid to measure the phase permeability for brine.

At block 206, the method includes measuring, via the downhole tool, magnetic permeability of the geological formation having the injected magnetic particles. The method may also include measuring, via the downhole tool, magnetic permeability of the geological formation before injecting the magnetic particles as a baseline or reference measurement. In some implementations, such prior measuring may be a form of calibration of the downhole tool.

The method may include emitting a magnetic field into the geological formation from the transmitter. This may be employed by the downhole tool in measuring the magnetic permeability. Further, the measuring of magnetic permeability may include sensing the magnetic field at the receiver of the downhole tool. The downhole tool via the measuring (and the electronics module) may obtain a set of radial profiles into the geological formation from the tool as a function of time. In certain embodiments, the measuring of the magnetic permeability includes reducing effect of electrical conductivity of the geological formation on the measuring of the magnetic permeability. Such may be implemented via the transmitter, the electronics module, and also a computing system at the Earth surface (local or remote). To reduce effect of a confounding parameter, such as conductivity, the method may specify the frequency of the emitted electromagnetic radiation or specify timing of the magnetic-permeability measurement, or both.

At block 208, the method includes correlating, via a hardware processor, the permeability with the magnetic permeability to determine the permeability of the geological formation. The evolving radial profiles of magnetic permeability may be a function of permeability. Therefore, the permeability can be determined or calculated. For instance, by comparing the radial profiles as a function of distance or time, the permeability may be obtained. The processor may be in the electronics module or in a computing system at the Earth surface (local or remote).

An embodiment is a method to determine the permeability downhole of a formation surrounding a borehole. The method includes deploying a downhole tool into the borehole at a specific depth and injecting a fixed amount of magnetic-permeability doped fluid into the formation around the downhole tool. The method includes measuring, via the downhole tool, a post-injection radial profile of magnetic permeability of the formation around the downhole tool after injecting the fixed amount of magnetic-permeability doped fluid. The method includes withdrawing fluid from the formation and measuring, via the downhole tool, a post-production radial profile of magnetic permeability of the formation around the downhole tool after withdrawing a fixed amount of fluid from the formation. The method includes correlating a difference between the post-production radial profile and the post-injection radial profile with permeability of the formation around the downhole tool. The method may include measuring, via the downhole tool, a radial profile of magnetic permeability of the formation around the downhole tool during the injecting of the fixed amount of magnetic-permeability doped fluid. Thus, the downhole tool or remote computer may determine the permeability correlative with a time rate of change of the radial profile of the magnetic permeability during the injecting of the fixed amount of magnetic-permeability doped fluid. The method may include measuring, via the downhole tool, a radial profile of magnetic permeability of the formation around the downhole tool during the withdrawal of the fixed amount of fluid from the formation. Thus, the downhole tool or remote computing system may determine the permeability of the formation around the downhole tool as correlative with a time rate of change of the radial profile of the magnetic permeability during the withdrawal. The method may also determine the permeability correlative with a time rate of change of the radial profile of the magnetic permeability over time during the combination of the injecting and subsequent withdrawal.

Figure 3:
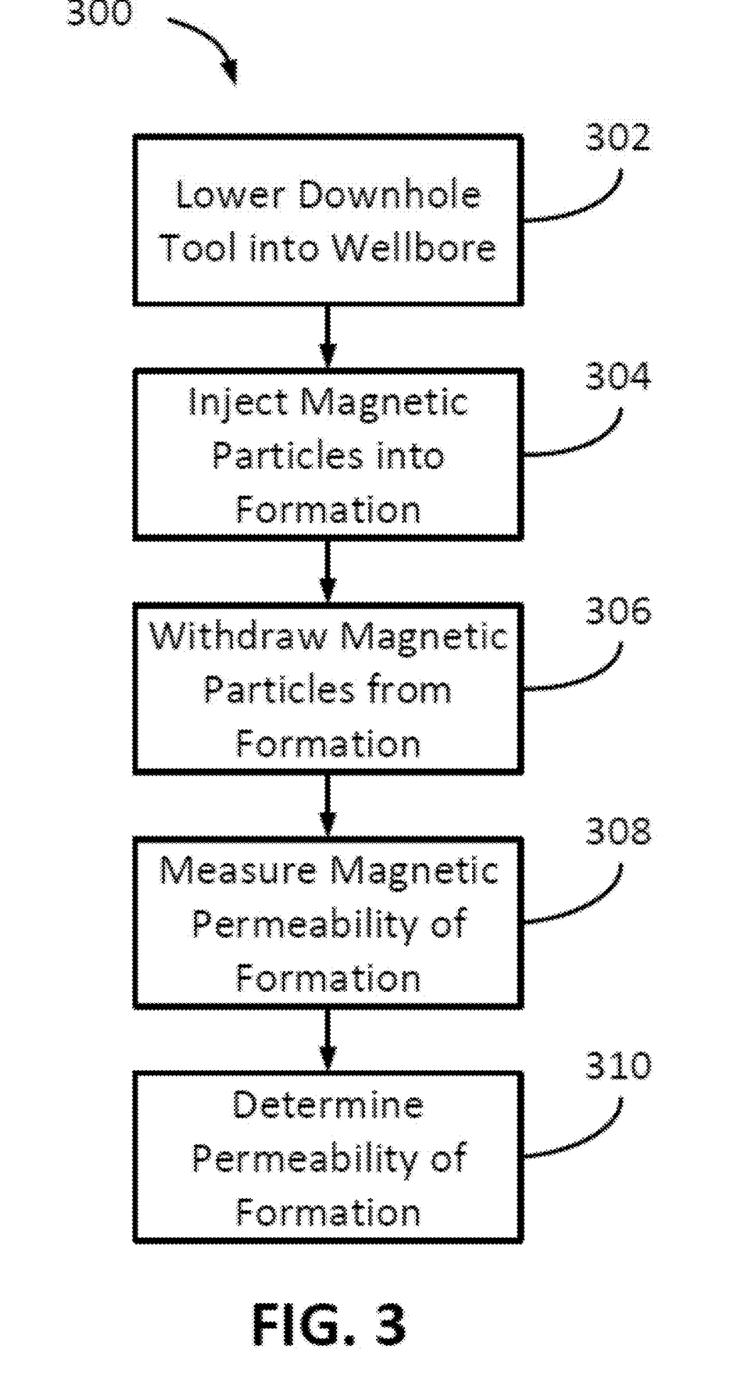
FIG. 3 is a block flow diagram of a method of determining permeability of a geological formation.

FIG. 3 is a method 300 to determine permeability of a geological formation in the Earth crust. At block 302, the method includes lowering a downhole tool into a wellbore in the formation. The downhole tool has a transmitter and a receiver. In some embodiments, the downhole tool has an electronics module to facilitate managing operation of the downhole tool. The downhole tool may be lowered into the wellbore via a wireline or coiled tubing.

At block 304, the method includes injecting magnetic particles through the wellbore into the formation. The injecting may include pumping fluid having the magnetic particles from the Earth surface through the wellbore into the formation. The method may include holding or storing fluid and magnetic particles in one or more vessels at the Earth surface.

At block 306, the method includes withdrawing the magnetic particles from the formation through the wellbore. The withdrawing of the magnetic particles may include receiving the magnetic particles from the formation through the wellbore to a vessel at the Earth surface. In one implementation, the withdrawing involves pumping fluid from the Earth surface through the wellbore into the formation to wash or displace the magnetic particles from the formation to a second wellbore. In another implementation, the withdrawing involves relying on formation pressure to produce (withdraw) the magnetic particles from the formation to the wellbore in which the downhole tool is disposed.

At block 308, the method includes measuring magnetic permeability of the formation via the downhole tool during injecting the magnetic particles and during withdrawing the magnetic particles. The measuring may involve emitting electromagnetic radiation waves from the transmitter, such as transmitter coil or coils, into the formation. If so, the measuring may also include receiving the electromagnetic radiation waves at the receiver such as at a receiver coil(s). The method may include measuring magnetic permeability of the formation via the downhole tool prior to injecting the magnetic particles. Also, the method may include calibrating the downhole tool in-air prior to lowering the downhole tool into the wellbore.

At block 310, the method includes determining, via a hardware processor, the permeability of the formation with respect to the measured magnetic permeability. For instance, the method may determine the permeability as a function of the magnetic permeability. The method may determine, via the processor, the permeability correlative with a profile of the magnetic permeability. The evolution of magnetic permeability radial profiles can be a function of permeability. By mapping the radial distribution of magnetic permeability and how the magnetic permeability changes during injection and production (withdrawal) of magnetic particles (for example, nanoparticles), the local-formation permeability can be obtained or measured in-situ.

Thus, certain embodiments relate to determining formation permeability around the wellbore by injecting fluid loaded with magnetic particles (for example, ferroelectric particles) into the formation and measuring the change in magnetic permeability radially surrounding the tool during injection and withdrawal of the fluid. A downhole sensor array measures the radial distribution of magnetic permeability by sensing changes in the response of sensors such as a series of transmitter and receiver coils. By mapping the radial distribution of magnetic permeability and how the magnetic permeability changes during injection and production of magnetic nanoparticles, the local-formation permeability can be obtained or measured in-situ.

To determine permeability downhole, the downhole-tool sensor array (transmitter and receiver coils) may make a baseline measurement of magnetic permeability of the geological formation before injection of magnetic particles. During injection of magnetic particles into the wellbore and dispersion through the formation, the sensor array may measure the magnetic permeability distribution and record changes to this measured distribution as the particles travel through the formation. The particle dispersion may then be then reversed by producing from the formation. The sensor array measures (for example, continually) the local magnetic permeability and records changes to this measured quantity over time. By measuring magnetic permeability during the baseline, injection of magnetic particles, and production of magnetic particles from the formation, the sensor array may obtain a set of radial profiles as a function of time. The evolving radial profiles of magnetic permeability may be a function of permeability and thus indicate permeability which therefore can be determined or calculated.

An embodiment is a system to determine the permeability downhole of a geological formation surrounding a borehole. The system includes a downhole tool to be deployed at a specified depth in a wellbore to measure magnetic permeability of the formation surrounding the downhole tool as a function of radial depth. The radial depth may be the radial distance from a longitudinal axis of the wellbore or from the longitudinal axis of the deployed downhole tool. The system includes a magnetic-permeability doped fluid to diffuse through the formation surrounding the downhole tool. The magnetic-permeability doped fluid may also be labeled as a magnetic doped fluid. The magnetic-permeability doped fluid may be fluid having magnetic particles. The fluid (for example, water or hydrocarbon) may be include (doped with) magnetic particles. The system to determine permeability includes a surface system (for example, the aforementioned associated surface equipment) having a pump to inject the magnetic-permeability doped fluid through the wellbore into the formation. The surface system includes a vessel to withdraw the magnetic-permeability doped fluid from the formation through the wellbore. A surface system may inject magnetic-permeability doped fluid into the formation surrounding the downhole tool through a different wellbore than the wellbore where the downhole tool is deployed. A surface system may produce the magnetic-permeability doped fluid from the formation through a different wellbore than the wellbore where the downhole tool is deployed.

In implementations, the downhole tool includes a transmitter having electronics and coils to transmit electromagnetic waveforms through the formation in a radial direction from a longitudinal axis of the wellbore and the downhole tool. The downhole tool includes a receiver having electronics and receiving coils to receive the electromagnetic waveforms through from the transmitter the formation and to normalize the electromagnetic waveforms. The downhole tool includes processor electronics to determine penetration distance of the magnetic-permeability doped fluid in a radial direction from a longitudinal axis of the wellbore and downhole tool as a function of time. The process electronics may correlate a time rate of change of magnetic permeability in the radial direction with permeability of the formation. The electromagnetic waveform may have a sine shape, a square shape, or a multi-waveform shape.

Some embodiments relate to permeability evaluation of a geological formation (having hydrocarbon) in the Earth by measuring formation magnetic permeability and/or electric conductivity via a downhole tool at various frequencies and distances between receiver and transmitter coils of the downhole tool. The changing of formation magnetic permeability and conductivity is sensed via a magnetic field traveling through the formation and induced responsive voltage in the receiver coils. Parameters that may affect receiver voltage induced by the transmitter include: coil configuration, number of turns, material of the tool, and transmitter output power. Certain embodiments measure electromagnetic or magnetic permeability and conductivity at various frequencies and distances between receiver and transmitter coils.

An embodiment is a system to determine permeability of a hydrocarbon formation in Earth. The system includes a downhole tool to be lowered into the wellbore in the hydrocarbon formation to measure magnetic permeability of the hydrocarbon formation. The downhole tool includes a transmitter to emit electromagnetic waves into the hydrocarbon formation. The system includes surface equipment at the Earth surface adjacent a wellbore to inject magnetic particles through the wellbore into the hydrocarbon formation. In certain implementations, the downhole tool has a receiver to sense the electromagnetic waves to measure the magnetic permeability. The system may have a hardware processor and memory storing code executable by the hardware processor to correlate the permeability with the magnetic permeability. In some implementations, the downhole tool has an electronics module having the hardware processor and the memory. The system may also include a computing system having the hardware processor and the memory.

Another embodiment is a system to determine permeability of a geological formation. The system includes surface equipment at the Earth surface adjacent a wellbore to inject fluid having magnetic particles through the wellbore into the geological formation. The system includes a downhole tool to be lowered into the wellbore in the geological formation to measure magnetic permeability of the geological formation. The downhole tool has a transmitter to emit electromagnetic radiation into the geologic formation and a receiver to sense the electromagnetic radiation. The downhole tool may have an electronics module to facilitate operation of the downhole tool. In implementations, the surface equipment includes a pump to inject the fluid having the magnetic particles.

Yet another embodiment is a downhole tool to determine permeability of a geological formation. The downhole tool has a coupling for wireline to lower the downhole tool into a wellbore in the geological formation. The coupling may include a loop, clamp, bolting, or connector. The downhole tool has a transmitter (for example, with a coil or coils) to emit electromagnetic radiation waves into the geological formation. The downhole tool has a receiver (for example, with a coil or coils) to sense the electromagnetic radiation waves for the downhole tool to measure magnetic permeability of the geological formation. The downhole tool includes an electronics module to facilitate operation of the downhole tool and to provide data of the measure magnetic permeability for determination of the permeability. The electronics module may have a processor and memory storing code executed by the processor to implement features. In certain implementations, the electronics module correlates the data with permeability to determine the permeability of geological formation. In some implementations, the electronics module is configured to provide the data to a computer at an Earth surface near the wellbore or remote from the wellbore. In one implementation, the electronics module in operation directs the transmitter to emit the electromagnetic radiation waves at a specified frequency to reduce effect of conductivity of the geological formation on the measure of the magnetic permeability.

What is claimed is:

1. A method to determine permeability downhole of a formation surrounding a borehole, comprising:
   deploying a downhole tool into the borehole at a specific depth;
   injecting a fixed amount of magnetic-permeability doped fluid into the formation around the downhole tool;
   measuring, via the downhole tool, a post-injection radial profile of magnetic permeability of the formation around the downhole tool after injecting the fixed amount of magnetic-permeability doped fluid;
   withdrawing fluid from the formation;
   measuring, via the downhole tool, a post-production radial profile of magnetic permeability of the formation around the downhole tool after withdrawing a fixed amount of fluid from the formation;
   correlating a difference between the post-production radial profile and the post-injection radial profile with permeability of the formation around the downhole tool;
   measuring, via the downhole tool, a radial profile of magnetic permeability of the formation around the downhole tool during the injecting of the fixed amount of magnetic-permeability doped fluid; and
   determining the permeability correlative with a time rate of change of the radial profile of the magnetic permeability during the injecting of the fixed amount of magnetic-permeability doped fluid.

2. A method to determine permeability downhole of a formation surrounding a borehole, comprising:
   deploying a downhole tool into the borehole at a specific depth;
   injecting a fixed amount of magnetic-permeability doped fluid into the formation around the downhole tool;
   measuring, via the downhole tool, a post-injection radial profile of magnetic permeability of the formation around the downhole tool after injecting the fixed amount of magnetic-permeability doped fluid;
   withdrawing fluid from the formation;
   measuring, via the downhole tool, a post-production radial profile of magnetic permeability of the formation around the downhole tool after withdrawing a fixed amount of fluid from the formation;
correlating a difference between the post-production radial profile and the post-injection radial profile with permeability of the formation around the downhole tool;
measuring, via the downhole tool, a radial profile of magnetic permeability of the formation around the downhole tool during the withdrawing of fluid from the formation; and
determining the permeability correlative with a time rate of change of the radial profile of the magnetic permeability during the withdrawing.

3. A method to determine permeability downhole of a formation surrounding a borehole, comprising:
deploying a downhole tool into the borehole at a specific depth;
injecting a fixed amount of magnetic-permeability doped fluid into the formation around the downhole tool;
measuring, via the downhole tool, a post-injection radial profile of magnetic permeability of the formation around the downhole tool after injecting the fixed amount of magnetic-permeability doped fluid;
withdrawing fluid from the formation;
measuring, via the downhole tool, a post-production radial profile of magnetic permeability of the formation around the downhole tool after withdrawing a fixed amount of fluid from the formation;
correlating a difference between the post-production radial profile and the post-injection radial profile with permeability of the formation around the downhole tool;
measuring, via the downhole tool, a radial profile of magnetic permeability of the formation around the downhole tool during the injecting of the fixed amount of magnetic-permeability doped-fluid;
measuring, via the downhole tool, the radial profile of magnetic permeability of the formation around the downhole tool during the withdrawal of the fixed amount of fluid from the formation; and
determining the permeability correlative with a time rate of change of the radial profile of the magnetic permeability during the injecting and during the withdrawal.

4. A method to determine permeability of a downhole formation surrounding a borehole, comprising:
deploying a downhole tool into a borehole at a specific depth;
measuring, via the downhole tool, a baseline radial profile of magnetic permeability of a formation around the downhole tool;
injecting a fixed amount of magnetic-permeability doped fluid into the formation surrounding the downhole tool;
measuring, via the downhole tool, a post-injection radial profile of magnetic permeability of the formation around the downhole tool after the injection of the fixed amount of magnetic-permeability doped fluid;
withdrawing fluid from the formation;
measuring, via the downhole tool, a post-withdrawal radial profile of magnetic permeability of the formation around the downhole tool after producing a fixed amount of fluid from the formation;
comparing the post-injection radial profile with the post-withdrawal radial profile in reference to the baseline radial profile to determine a difference between the post-injection radial profile versus the post-withdrawal radial profile; and
correlating the difference with the permeability of the formation around the downhole tool.

5. A method comprising:
deploying a downhole tool into a wellbore in a geological formation;
injecting a fluid having magnetic particles into the geological formation;
measuring, via the downhole tool, a post-injection radial profile of magnetic permeability of the formation after injecting the fluid having the magnetic particles;
withdrawing a produced fluid having magnetic particles from the geological formation;
measuring, via the downhole tool, a post-production radial profile of magnetic permeability of the geological formation after withdrawing the produced fluid having magnetic particles from the geological formation;
correlating a difference between the post-production radial profile and the post-injection radial profile with permeability of the geological formation;
measuring, via the downhole tool, a radial profile of magnetic permeability of the geological formation during the injecting of the fluid having magnetic particles; and
determining the permeability of the geological formation correlative with a time rate of change of the radial profile of the magnetic permeability during the injecting of the fluid having magnetic particles.

6. A method comprising:
deploying a downhole tool into a wellbore in a geological formation;
injecting a fluid having magnetic particles into the geological formation;
measuring, via the downhole tool, a post-injection radial profile of magnetic permeability of the formation after injecting the fluid having the magnetic particles;
withdrawing a produced fluid having magnetic particles from the geological formation;
measuring, via the downhole tool, a post-production radial profile of magnetic permeability of the geological formation after withdrawing the produced fluid having magnetic particles from the geological formation;
correlating a difference between the post-production radial profile and the post-injection radial profile with permeability of the geological formation;
measuring, via the downhole tool, a radial profile of magnetic permeability of the geological formation around the downhole tool during the withdrawing of the produced fluid having magnetic particles; and
determining permeability of the geological formation correlative with a time rate of change of the radial profile of the magnetic permeability during the withdrawing of the produced fluid having magnetic particles.

7. A method comprising:
deploying a downhole tool into a wellbore in a geological formation;
injecting a fluid having magnetic particles into the geological formation;
measuring, via the downhole tool, a post-injection radial profile of magnetic permeability of the formation after injecting the fluid having the magnetic particles;
withdrawing a produced fluid having magnetic particles from the geological formation;
measuring, via the downhole tool, a post-production radial profile of magnetic permeability of the geological formation after withdrawing the produced fluid having magnetic particles from the geological formation;

correlating a difference between the post-production radial profile and the post-injection radial profile with permeability of the geological formation;

measuring, via the downhole tool, a radial profile of magnetic permeability of the geological formation during the injecting of the fluid having magnetic particles;

measuring, via the downhole tool, the radial profile of magnetic permeability of the geological formation during the withdrawing of the produced fluid having magnetic particles; and determining the permeability correlative with a time rate of change of the radial profile during the injecting and during the withdrawing.

\* \* \* \* \*